(12) United States Patent
Barthold et al.

(10) Patent No.: US 10,978,959 B2
(45) Date of Patent: Apr. 13, 2021

(54) CAPACITIVE-BASED POWER TRANSFORMATION

(71) Applicants: Lionel O. Barthold, Queensbury, NY (US); Electranix Corporation, Winnipeg (CA)

(72) Inventors: Lionel O. Barthold, Queensbury, NY (US); Dennis Woodford, Winnipeg (CA); Maryam Salimi, Stuttgart (DE)

(73) Assignees: Lionel O. Barthold, Queensbury, NY (US); Electranix Corporation, Winipeg (CA)

( * ) Notice: Subject to any disclaimer, the term of this patent is extended or adjusted under 35 U.S.C. 154(b) by 0 days.

(21) Appl. No.: 16/552,668

(22) Filed: Aug. 27, 2019

(65) Prior Publication Data

US 2020/0059162 A1 Feb. 20, 2020

Related U.S. Application Data

(63) Continuation of application No. PCT/US2018/019598, filed on Feb. 24, 2018.
(Continued)

(51) Int. Cl.
*H02M 5/42* (2006.01)
*H02M 3/06* (2006.01)
*H02M 3/07* (2006.01)

(52) U.S. Cl.
CPC ............. *H02M 5/42* (2013.01); *H02M 3/06* (2013.01); *H02M 3/07* (2013.01)

(58) Field of Classification Search
CPC ............ H02M 3/07; H02M 7/06; H02M 7/10; H02M 7/19; H02M 7/25; H02M 3/06;
(Continued)

(56) References Cited

U.S. PATENT DOCUMENTS

| 2011/0292687 A1* | 12/2011 | Barthold | ................. H02M 3/07 363/15 |
| 2016/0062378 A1 | 3/2016 | Ruiz et al. | |

FOREIGN PATENT DOCUMENTS

| WO | 2015/156854 A1 | 10/2015 |
| WO | 2017/027681 A1 | 2/2017 |

OTHER PUBLICATIONS

The International Search Report and the Written Opinion of the International Searching Authority dated May 31, 2018 for PCT Application PCT/US2018/19598.

* cited by examiner

*Primary Examiner* — Bryan R Perez
(74) *Attorney, Agent, or Firm* — Brian M. Dingman; Dingman IP Law, PC

(57) ABSTRACT

A power transformation system that is constructed and arranged to transform power from one or more primary voltage nodes to a separate secondary voltage node using one or more columns comprised of a plurality of capacitive modules each of which is capable of being either electrically inserted into the column or electrically isolated and electrically bypassed. There is a secondary voltage node, at a non-ground potential, to which a first end of the column is electrically connected. In the two-primary node example there are two high voltage switches, each in series with a reactor; one high-voltage switch adapted to electrically connect a second end of the column to the first primary voltage node and the other high-voltage switch adapted to electrically connect the second end of the column to a second primary node. A controller is adapted to control high voltage switches to connect the capacitances comprising the column sequentially to each primary node so as to transform power, by resonant exchange of energy, between those primary nodes and the secondary node.

11 Claims, 19 Drawing Sheets

Related U.S. Application Data

(60) Provisional application No. 62/464,115, filed on Feb. 27, 2017.

(58) Field of Classification Search
CPC .......... H02M 3/04; H02M 3/073; H02M 3/08; H02M 2003/071; H02M 2003/072; G11C 5/145
USPC ...................................... 363/15–17, 130–150
See application file for complete search history.

CAPACITIVE-BASED POWER TRANSFORMATION

CROSS-REFERENCE TO RELATED APPLICATIONS

This application is a continuation of and claims priority of Application PCT/US2018/019598, filed on Feb. 24, 2018, which itself claimed priority of Provisional Application 62/464,115, filed on Feb. 27, 2017.

FIELD

This innovation pertains to conversion of electric power between multiple nodes, of either constant or sinusoidally varying voltage without the use of magnetically based transformers and within an example context of high voltage electric power transmission systems.

BACKGROUND

Technologies used in transformation of electric power between alternating current (AC) and direct current (DC) have advanced rapidly, as has the use of DC as a means of transporting large amounts of power. While AC developed into networked systems very shortly after its introduction, DC's use has been largely limited to point-to-point transfer of large blocks of power, the latter limit due in part because with DC, unlike AC, it is difficult to directly transform power from one DC voltage node to another of differing voltage.

The above notwithstanding, evolution of the world's electric supply system have brought the industry to the point where large networks of interconnected DC lines are needed to overlie existing AC systems; a development that will, in integrating major existing DC lines, require an economic means of transforming power between two or more DC nodes of differing voltage.

As system planners address reliability issues associated with the prospective overlay of AC systems with DC grids, it becomes apparent that any equipment configuration connecting the DC grid with AC system must be self-redundant, i.e. capable of suffering the loss of any one DC line or its associated equipment without interruption of exchange of power to or from the underlying AC system. Conventional high voltage electrical equipment can fulfill that requirement by the configuration shown in FIG. 1, wherein two DC lines entering a junction point convert their power to AC by conventional AC-to-DC converters 20, then then transform the resulting AC power to the appropriate AC voltage by magnetic transformers 21 and thence to an AC node 22, thus allowing exchange from either of the incoming DC lines during failure of the other line or its associated terminal equipment. While the configuration of FIG. 1 satisfies the self-contingent requirement, it is expensive, requires a large substation area, and permits transfer of power between the two incoming DC lines only by means of double DC/AC conversion.

Furthermore high voltage DC grids will, as do AC grids, require an economic means of transforming power from one DC voltage level to another, a function previously achieved in a limited number of applications by triple transformation; first transforming DC to AC through conventional converter systems, then using magnetic transformers to convert AC to a different voltage level, and finally converting the new AC voltage back to DC through the same conversion technology. The need for a more direct means of DC-to-DC transformation has led to proposals of competing technological options, the simplest of which is based on columns of capacitive modules, each of which is first charged with all modules in series by the voltage present on a higher DC node, then reconfigured with a lesser number of modules in series before charge exchange with a second, lower voltage node. The novel systems and methods described herein, extend the principles used on column-based DC-to-DC transformation to enable an economic means of achieving self-redundant ties to underlying AC systems while simultaneously allowing transfer of power from one incoming DC line to another without double conversion between AC and DC.

SUMMARY

The present disclosure makes use of the prior art associated with DC-to-DC transformers (DCTs) in which capacitive columns, made up of individual capacitive modules alternately accept electric charge from one DC node and then deliver it to one or more others. The following paragraphs will begin with a brief review of the operating principles inherent in such DCTs, followed by revelation of novel systems, methods, and configurations the embodiments of which allow self-redundant exchange of power between multiple DC transmission lines and an AC system, i.e. a system and method whereby exchange between AC and DC systems survives, without reduction of power exchange, the loss of either of two DC lines or associated components of DC to AC terminal equipment.

Throughout this document power electronic switches used within various disclosures are illustrated as simple switch symbols. The reader should be aware they would, in practice, usually be thyristors, gate turn off thyristors (GTOs) or insulated gate bipolar transistors (IGBTs).

FIG. 2 illustrates the functionality of a capacitive column-based DCT system 250, in which switch 12 is closed (while switch 13 is open) and so connects a column 100 of n capacitors or capacitive modules 90 between neutral node 1 and a higher voltage node 2 with all the capacitances or capacitive modules 90 comprising the column 100 in electrical series. Then, as in FIG. 3, switch 13 is closed and switch 12 is opened, connecting the column 100 to a lower voltage node 3 but not before (n-m) of the capacitors in the column 100 are isolated and electrically by passed—thus presenting a lower voltage to node 3. While the lesser number of capacitors, m, remains constant during the column's connection to the lower voltage node 3, the actual capacitors or capacitive modules 90 comprising that number m may be rotated among the capacitive module 90 comprising the column 100, such that, following connection to the lower voltage node 3, all capacitances 90 in the column 100 are left with equal charge. Thus, the voltage ratio achieved in such a transformation is equal to n/m. The timing and sequence of switch opening and closing in this and subsequent figures is governed by logic within a controller 95, presumed to be present in all subsequent embodiments but omitted from their drawings for the sake of simplicity. DCT systems of the type illustrated in FIGS. 2 and 3 are further disclosed in patent application PCT/US15/10274, the entire disclosure of which is incorporated herein by reference. Accordingly, some details of these DCT systems are not further described herein.

FIGS. 2 and 3 represent steady-state operation. Not shown in either figure is a resistor that must be inserted in series with the column during start-up to allow initial exponential charge of the column, after which that resistor is bypassed during normal operation. Reactors 70 shown in FIGS. 2 and 3 allow resonant charge transfer between high voltage nodes 2 or 3, and the capacitive column 90, each such transfer characterized by a half-cycle sinusoidal wave form, interrupted at its first current zero.

It will be apparent that in any two-node, column-based DCT, the sequential exchanges of charge between any given node during a switching cycle will, as shown in FIG. 4, result in a current wave-form consisting of a half sine wave pulse followed by an equal period of zero current while the capacitive column 100 is being connected to the alternative node. It will also be apparent that the use of multiple capacitive columns in parallel, as shown in FIG. 5 for three capacitive columns DC will both increase the MW rating of the DCT and, given equal offset in initiation of charge transfers within each of the three, i.e. equal time offset between closing and opening of switch groups 12 and 13, 14 and 15, and 16 and 17, a smoother waveform as shown in FIG. 6 for the sinusoidal charge exchange method.

The configuration of FIG. 5 can be extended by its mirror image configuration as shown in FIG. 7, using columns 100 to serve the positive pole and columns 101 the negative pole, to provide transformation between two bipolar nodes, one bipole represented by nodes 2 and 4, the other by nodes 3 and 5. For a floating bipole DC configuration, i.e. a bipolar system where no firm ground is established, the system of FIG. 7 can be simplified as shown in FIG. 8, and further as shown in FIG. 9 wherein a single capacitive column 110 separates positive nodes 2, 3 and negative nodes 4, 5.

Subsequent paragraphs will describe embodiments that extend the basic configuration of FIG. 7 by disconnecting the neutral bus 1 from ground and allowing it to assume a determined voltage with respect to ground.

In one aspect, a power transformation system that is constructed and arranged to transform power from one or more primary voltage nodes to a separate secondary voltage node, includes one or more columns, each column comprising a plurality of capacitive modules, where the capacitive modules comprise a plurality of series-connected capacitances that are arranged to be either electrically inserted into the column or electrically isolated and electrically bypassed, a secondary voltage node that is at a non-ground potential, wherein a first end of a column is electrically connected to the secondary voltage node, multiple high voltage switches, each in series with a column; each high-voltage switch adapted to electrically connect, sequentially, a second end of the column to a primary voltage node, and a controller adapted to control the connections of the capacitances within a column and two high voltage switches that are in series with the column, so as to transform power by resonant exchange of energy between multiple capacitances within the column and both primary and secondary nodes.

Examples may include any one or more of the following features. The power transformation system may further comprise a fourth node that is at a ground potential, and a capacitor that is electrically connected between the secondary node and the fourth node. An aggregate voltage rating of all capacitive modules comprising a column may exceed the voltage of any of the primary voltage nodes. The power transformation system may be configured to transform power between primary DC nodes and an additional DC secondary node, all of which are bipolar DC nodes.

Embodiments may include one of the above and/or below features, or any combination thereof. The primary nodes may be high voltage DC nodes. The resonant exchange may comprise a repeating cycle of sequential charge exchanges with each of the primary nodes, and the controller may be further adapted to control one or both the number and configuration of series-connected capacitive modules comprising the capacitive column, such that a terminal-to-terminal voltage of the capacitive column is changed from one step in the capacitive column charge exchange cycle and the next. The controller may be further adapted to configure the potential of the secondary voltage node to be equal to the voltage of any one of the primary voltage nodes minus the terminal-to-terminal voltage of the capacitive column. The controller may be further adapted to prevent the potential of the secondary voltage node from drifting from its nominal value.

Embodiments may include one of the above and/or below features, or any combination thereof. The controller may be further adapted to reconfigure the capacitive column from one cycle to the next such that the potential of the secondary voltage node varies in a manner approximating a sinusoid. The capacitive column may be configured such that its voltage is greater than the voltage of any of the primary voltage nodes, thereby allowing the voltage on the secondary node to be a full sinusoidal voltage, with positive and negative half-cycles that are equal in voltage magnitude with respect to ground. The power transformation system may comprise multiple capacitive columns that are controlled to simultaneously transform power from one or more primary nodes to three secondary nodes each one of which represents one phase of a three phase AC node. The DC primary nodes may be bipolar, where each pole is configured to transform power to a three-phase AC node set.

DETAILED DESCRIPTION

Figure 7:
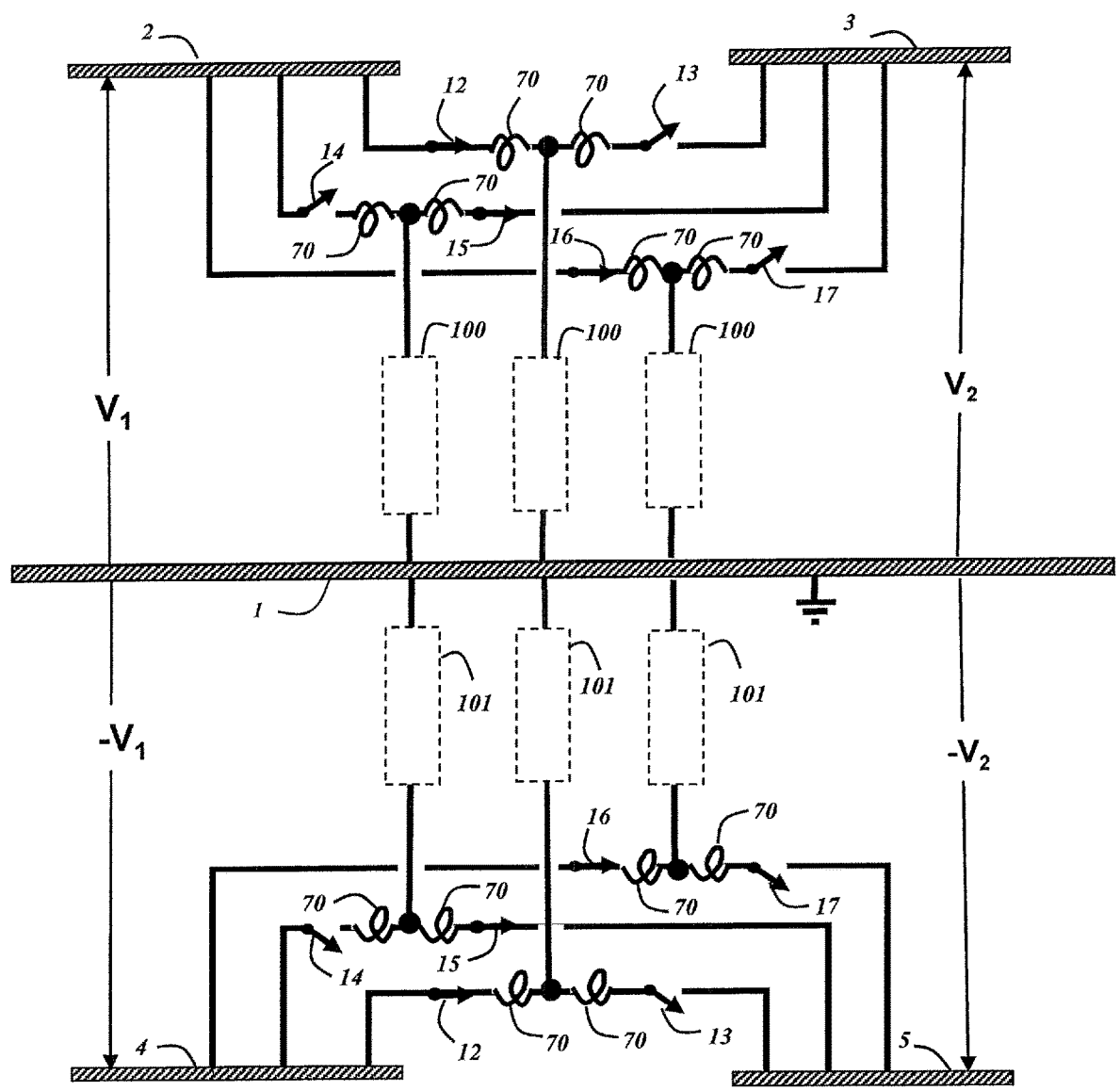
FIG. 7 shows a prior art three capacitive column-based DCT used to transform power between two bipolar DC nodes.
Figure 8:
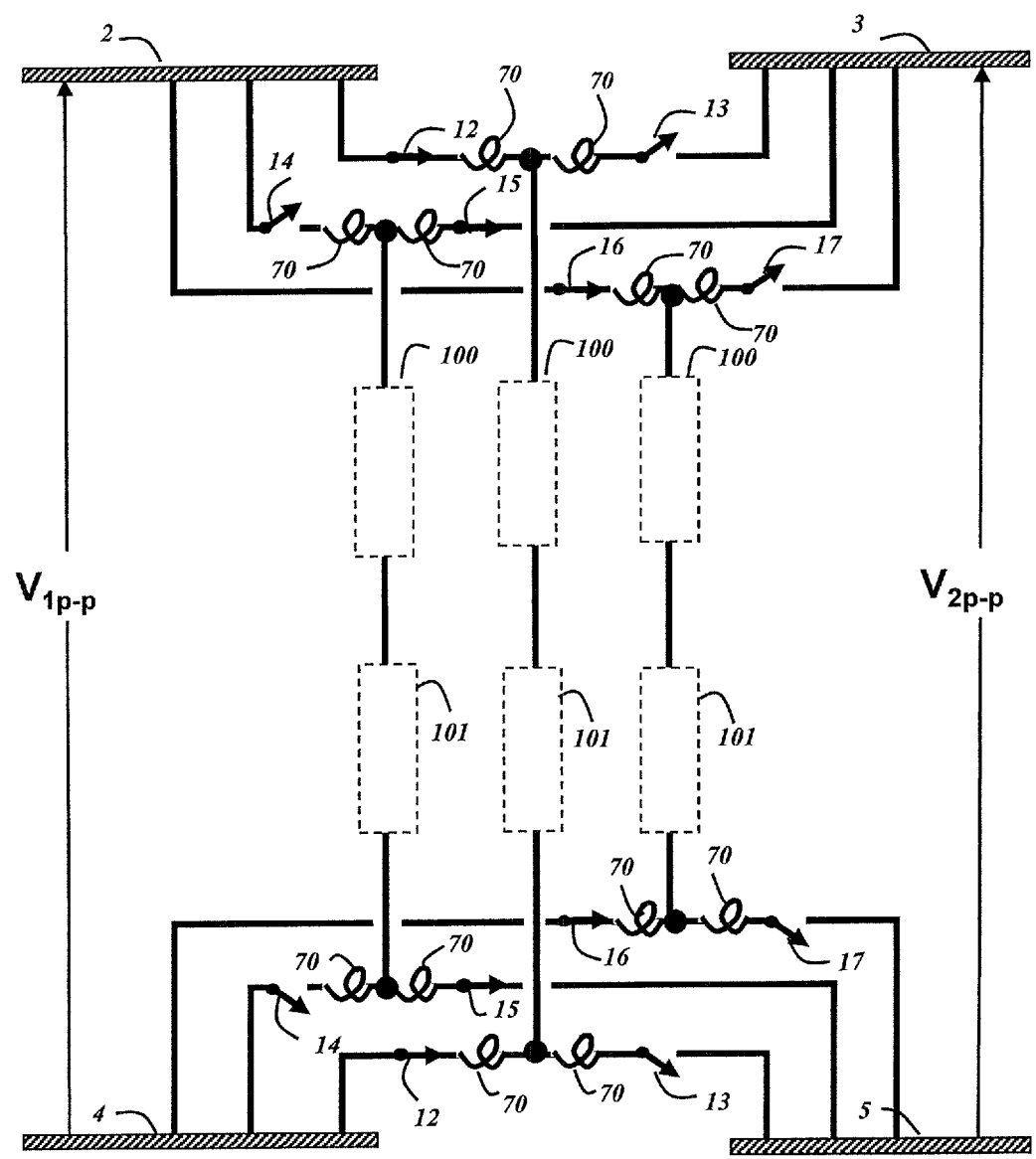
FIG. 8 shows a prior art adaptation of the configuration in FIG. 7 for the case where no ground is established in transformation between two bipolar DC nodes.
Figure 9:
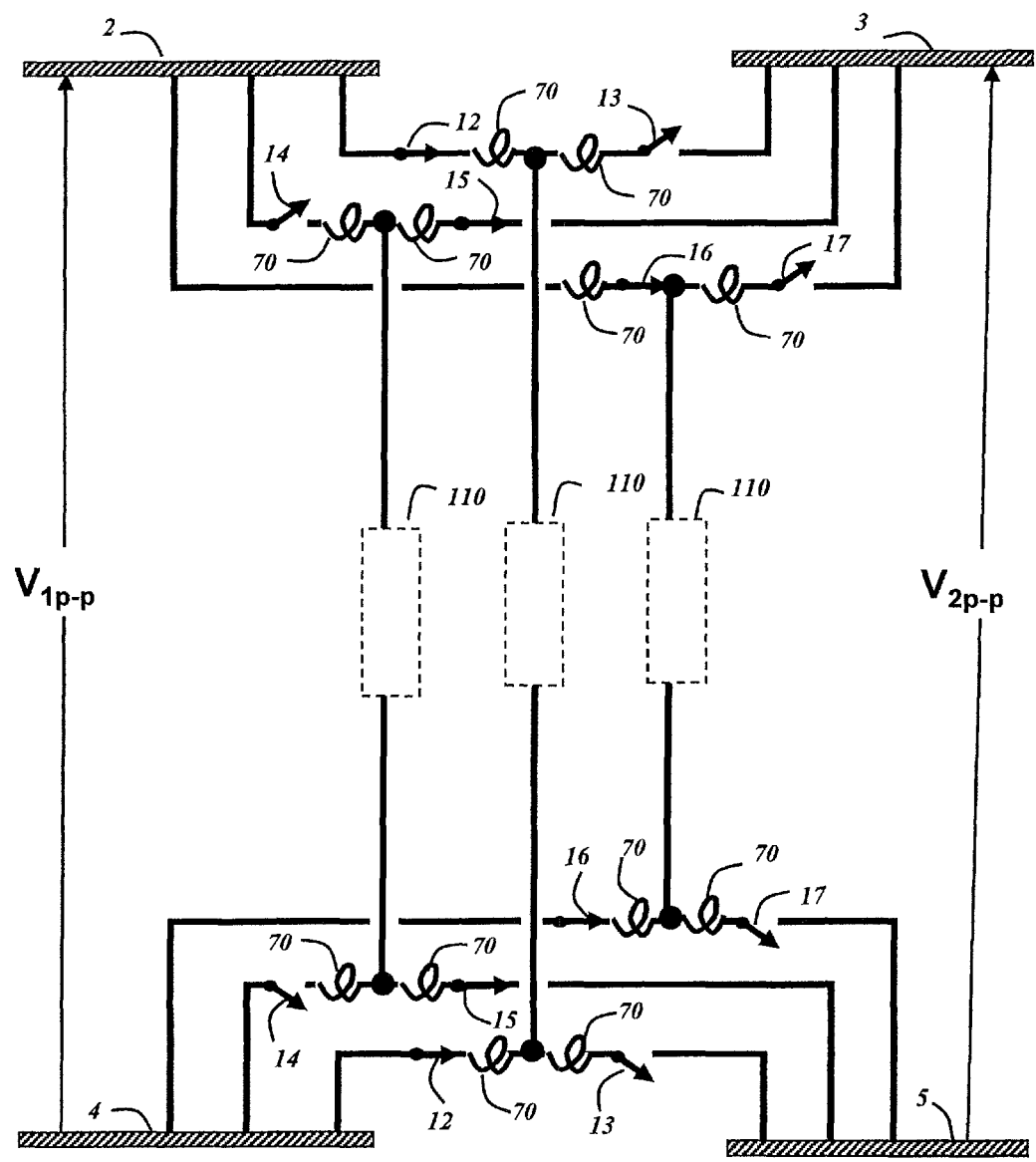
FIG. 9 shows a prior art simplification of the configuration shown in FIG. 8.
Figure 10:
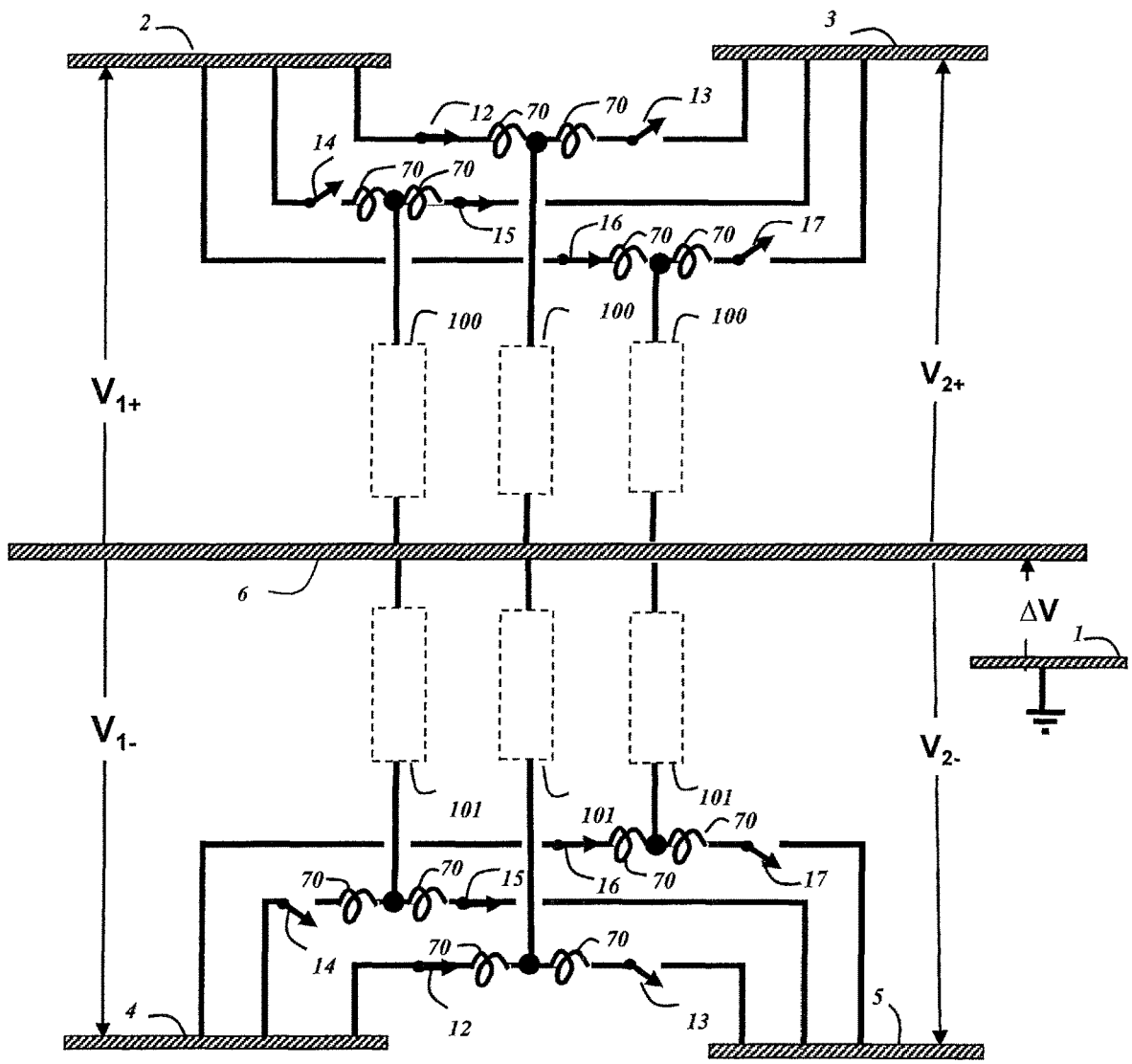
FIG. 10 shows a system of the present disclosure where the junction of positive and negative capacitive columns is isolated from ground and caused to assume a voltage equal to the difference between positive and negative column voltages.

FIG. 10 illustrates a DC-to-DC transformation similar to that shown in FIG. 7 but with the juncture of positive and negative capacitive columns connected to a common node 6 at some electrical potential, ΔV, other than ground by causing voltages $V_1+$ and $V_1-$ to be unequal and $V_2+$ and $V_2-$ to also be unequal while the absolute sum of $V_1+$ and $V_1-$ remains equal to node-to-node primary voltage and the absolute sum of $V_2+$ and $V_2-$ equal to the secondary node-to-node voltage. The result is a voltage displacement of node 6 above ground potential by $\Delta V=|V_{1+}|-|V_{1-}|=|V_{2+}|-|V_{2-}|$; thus, adding to the DCT another node of voltage ΔV. Functions of this additional node 6 are further described below.

Figure 11:
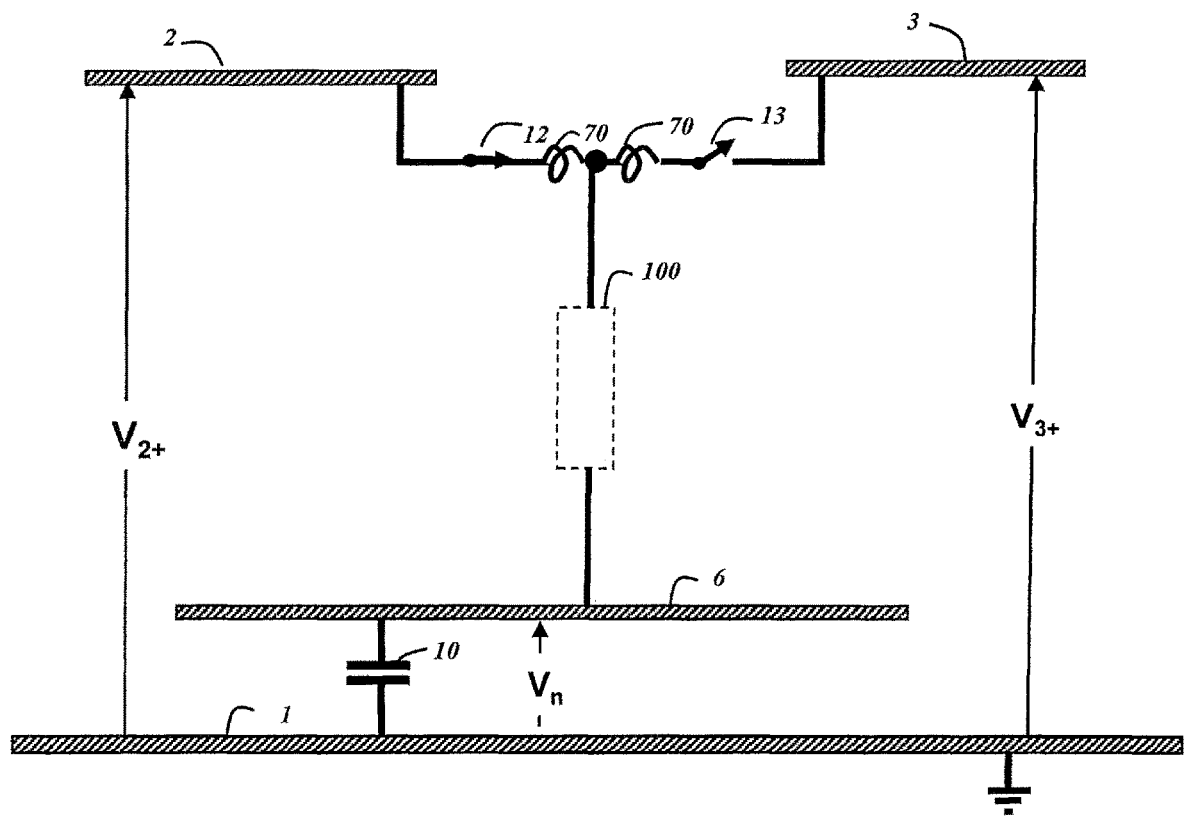
FIG. 11 shows a simplified example of embodiments that include an additional bus with a non-ground voltage which functions as a third independent node.

The voltage displacement of node 6, ΔV, can be realized as disclosed in principle by FIG. 11. In that elementary embodiment, the voltage of the column can be decreased between connection to nodes 2 and 3 by electrically bypassing modules within the column 100 or increased by electrically inserting in series with the column, modules that were previously charged in a "sorting process," i.e., one in which, during connection to either node 2, 3, the number of capacitive modules in electrical series was kept constant but sequentially shared by multiple columns.

In order that the resonant discharge of the capacitor column have a path to the ground node 1 and that it appear predominantly between a secondary node 6 and ground, a capacitor 10 must be inserted connecting that secondary node 6 and ground 1 and, further, that capacitor 10 which will contribute to the resonant frequency of discharge of the column 100, must have a capacitance much smaller than the capacitance of the column 100, i.e., its susceptance must be much larger than that of the column.

Figure 3:
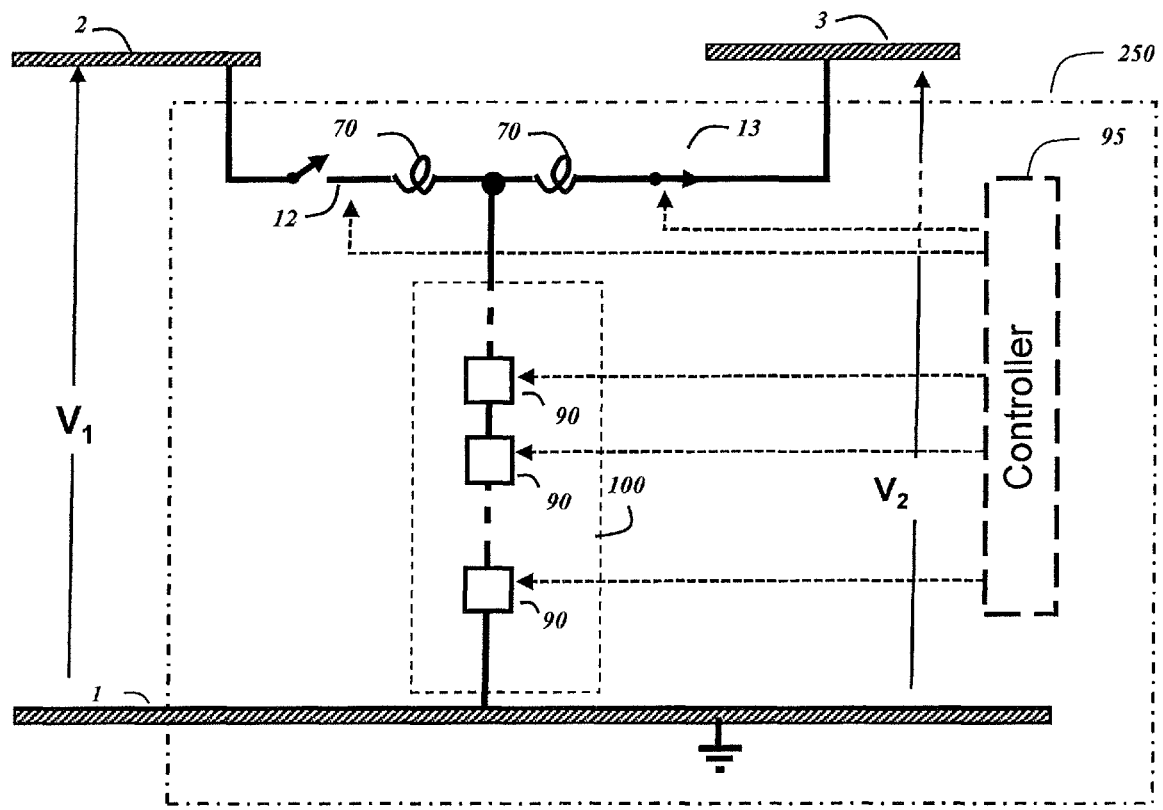
FIG. 3 shows a prior art schematic of a capacitive column DCT, based on prior art, when connected to exchange charge with the second of two DC nodes.
Figure 4:
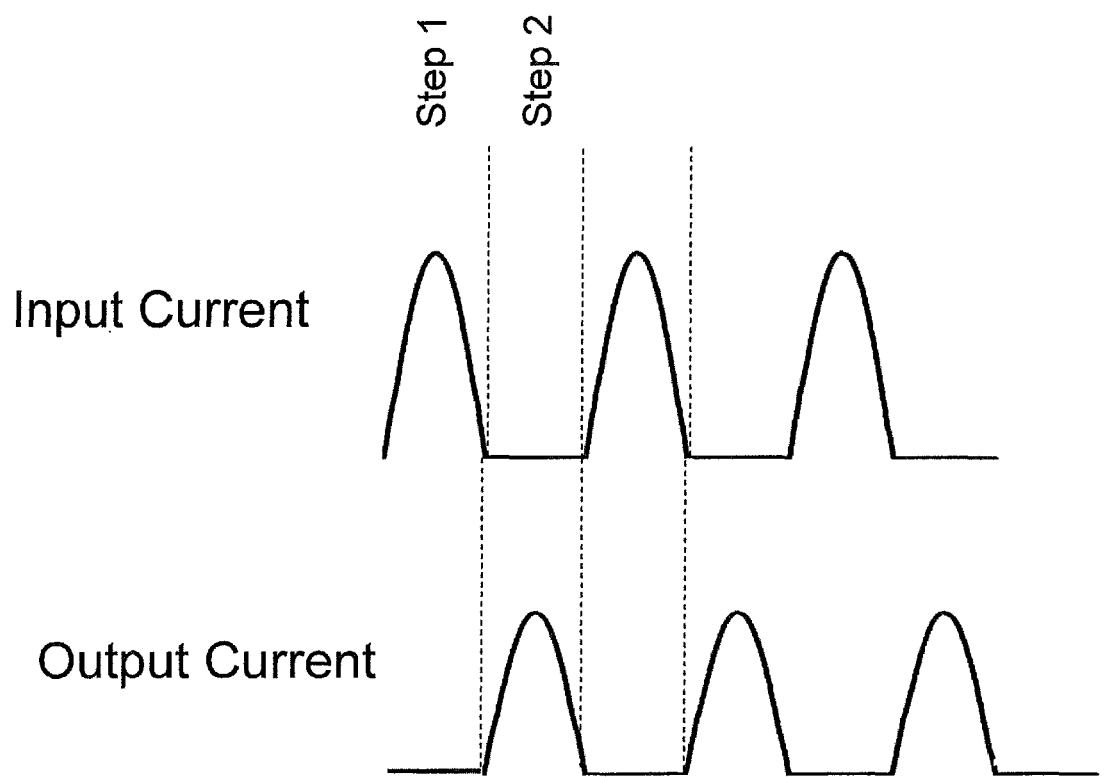
FIG. 4 shows the prior art pulsed nature of input and output current profiles for a single capacitive column DCT.
Figure 5:
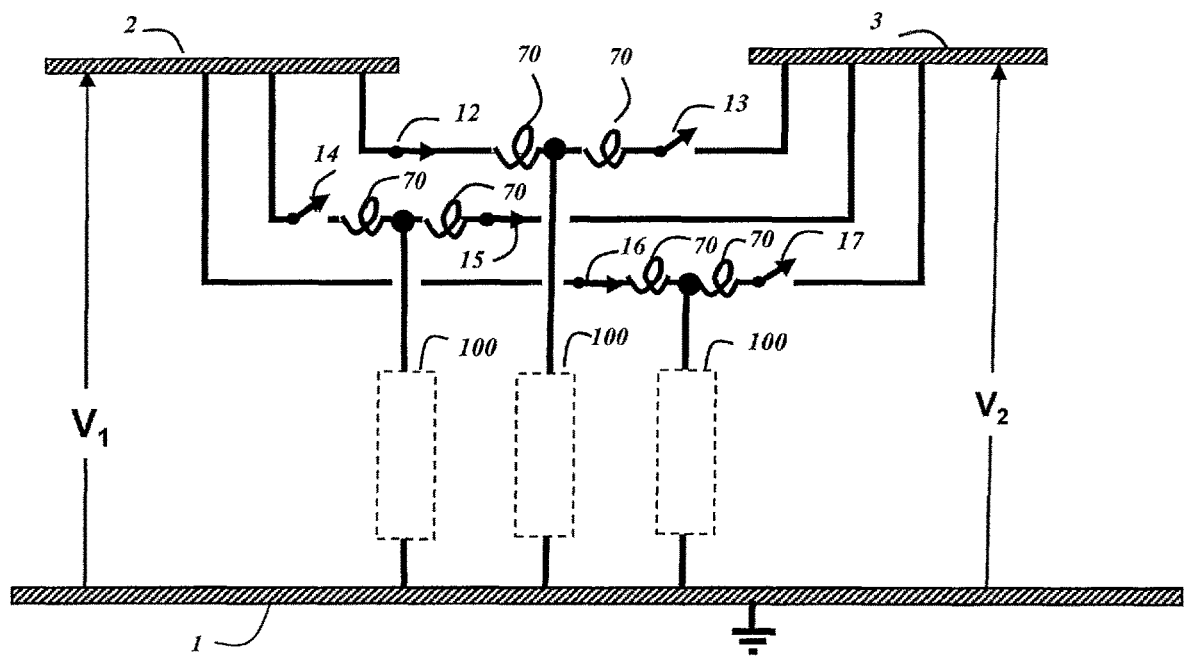
FIG. 5 shows a prior art three capacitive column DCT that is configured to increase power exchange capability and cause smoother input and output current wave-shapes.
Figure 6:
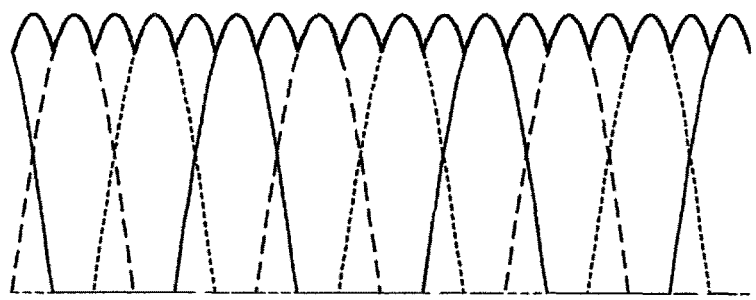
FIG. 6 shows the prior art smoothing effect on both input and output wave-forms achieved by using the three-capacitive column DCT of FIG. 5.
Figure 12:
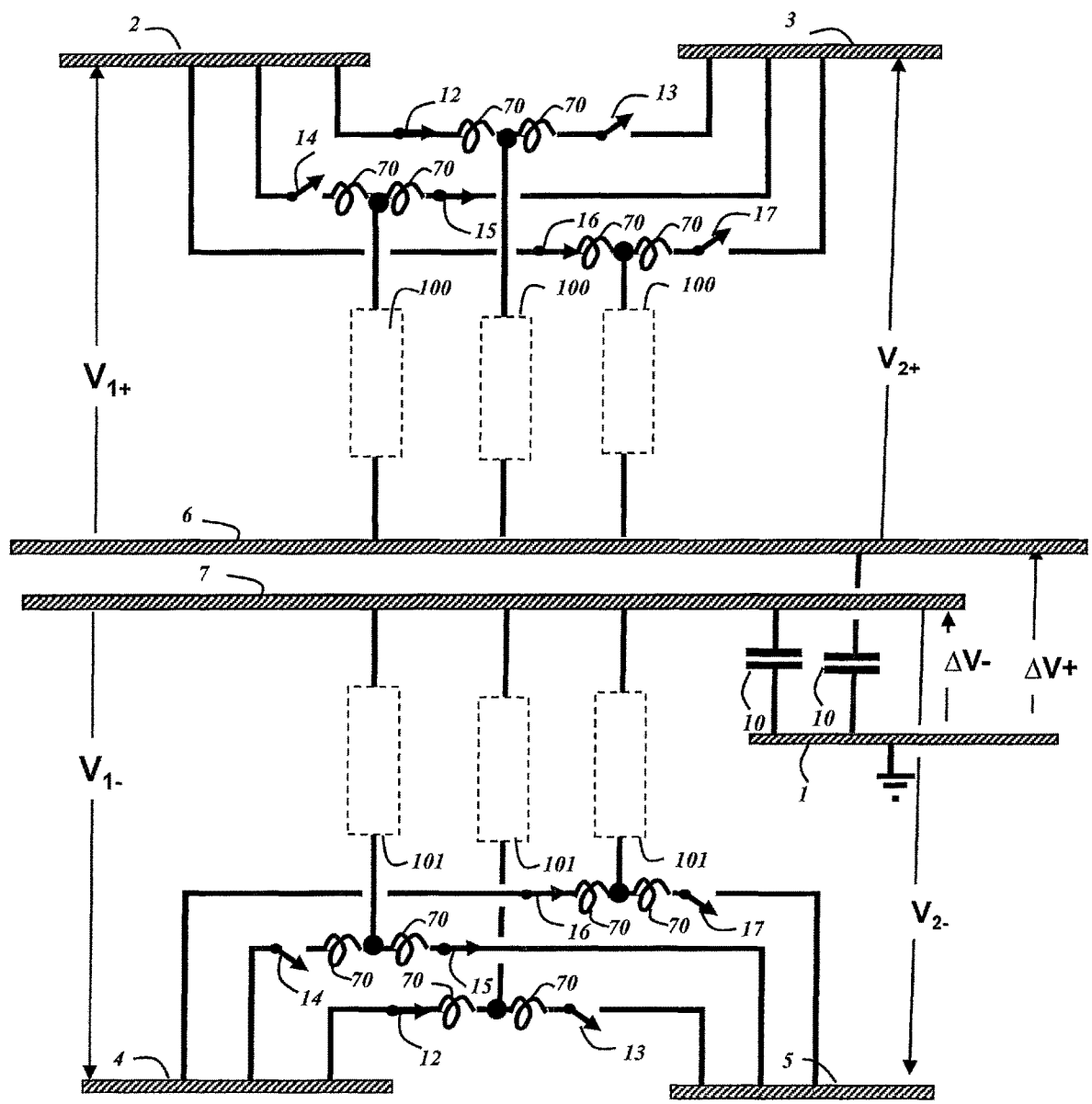
FIG. 12 shows extension of FIG. 11, using a three-column DCT for each of two poles, each pole supplying its own third independent node.

The principle illustrated by FIG. 11 for a monopolar DC case can be extended to include three capacitive columns 100, each of which is assigned a switching cycle offset equally from the others as was illustrated in FIG. 3, and extended further by addition of a mirror image configuration supplied by the negative polarity first nodes 4, 5 as shown in the embodiment illustrated in FIG. 12. In that embodiment the additional node 6, supplied by the positive nodes 2, 3 will itself be positive in polarity and the additional node 7, supplied by the negative first nodes 4, 5, will be negative in polarity.

Figure 13:
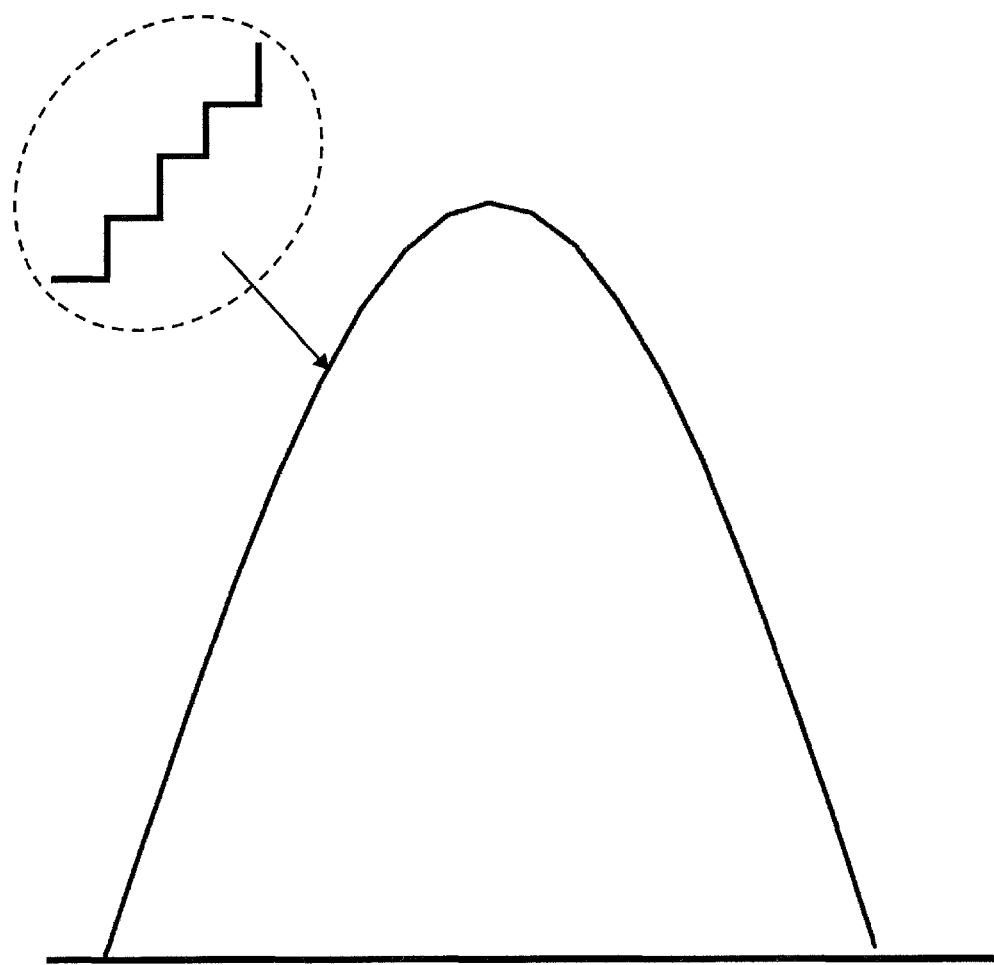
FIG. 13 shows a power frequency half-sine wave approximated by successive DCT charge exchanges, each changed in ratio from the prior.
Figure 14:
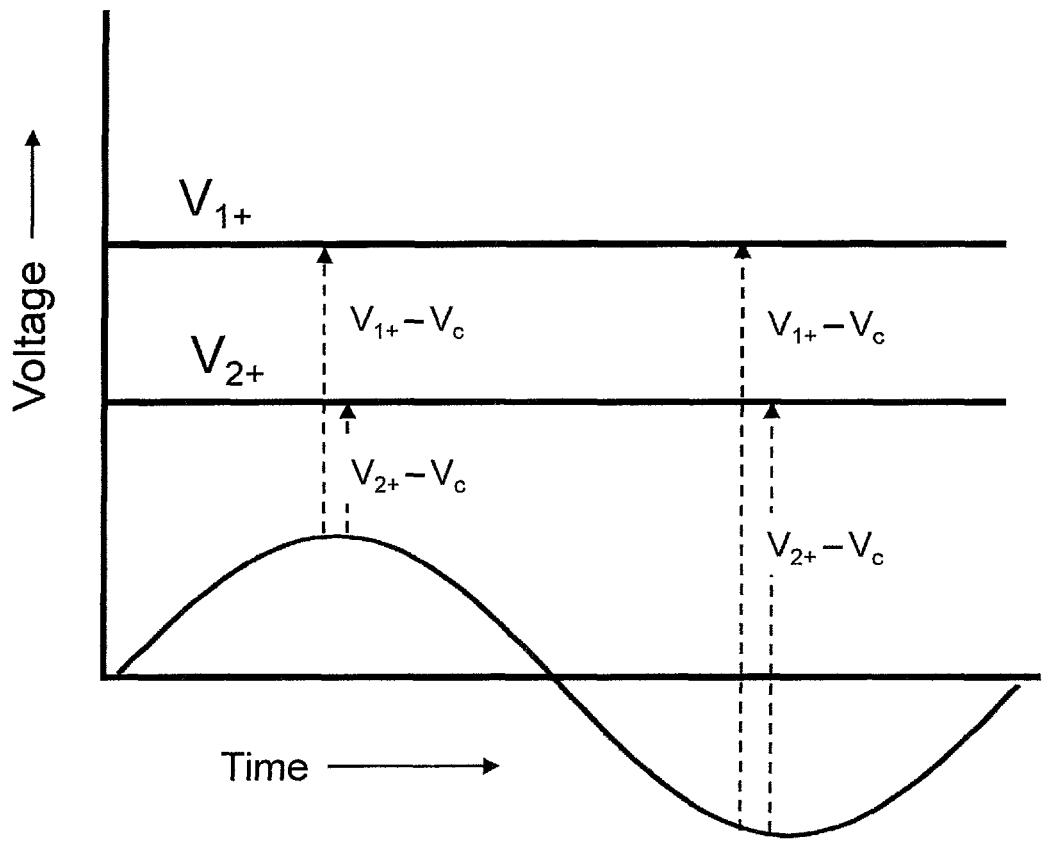
FIG. 14 shows the division of voltage within the configuration of FIG. 11 when it is used to generate an AC wave-form.

Prior art has shown that the typical resonant frequency of half-sine-wave charge/discharge cycles of a column-based DC-to-DC transformer, being an order of magnitude higher than power frequencies, can allow the DC-to-DC transformation ratio of an MMDCT to be varied from one charge/discharge cycle to the next to approximate a power frequency half-sine wave as shown in FIG. 13. Thus, by varying the number of capacitive modules in the elementary single-column transformer of FIG. 11, an embodiment using that configuration can also be made to approximate a half-cycle of power frequency voltage. In doing so FIG. 14 shows that during steps in the cycle where the capacitive column 100 is connected to node 2, the capacitive modules within the capacitive column 100 must be selected such that the voltage across the column 100, $V_c$, must be such that $V_{2+}-V_c=V_{ac}$, and since the column is rapidly switched between DC nodes 2 and 3, that during connection to node 3, $V_c$ is such that $V_{3+}-V_c=V_{ac}$. FIG. 14 shows that, while achieving the required column voltage by appropriate selection of capacitive modules in series is obvious for the positive half-cycle, achieving it for the negative half cycle of the AC wave requires that (1) sufficient capacitive modules be in place such that their cumulative voltage rating of all capacitive modules is substantially higher than the higher of the two DC node voltages and (2) that subgroups of the total number of capacitive modules be separately charged to the DC voltage such that, when it is necessary that the (subtracting) column voltage, $V_C$ be greater than the DC node voltage, $V_{2+}$ or $V_{3+}$, sufficient voltage can be achieved within the capacitive column 100.

Thus, the elementary embodiment shown in FIG. 11 can transform between a monopolar DC node and a single phase alternating current node with equal positive and negative voltages with respect to a ground node 1. As with the prior art DC-DC transformer configuration illustrated in its elementary form by FIG. 2, periodic adjustment of the specific number of capacitive modules within the capacitive column 100, can control the direction and magnitude of power transfer between any two of the three nodes 2, 3, 6 shown in FIG. 11.

It should be noted that with the embodiment of FIG. 11 adapted to DC-AC-DC operation, slight inconsistencies in voltage from one operating cycle to another could cause a build-up of DC voltage on the grounding capacitor 10. To prevent that a reactor 11 can be inserted between bus 6 and ground as shown in FIG. 15.

Figure 2:
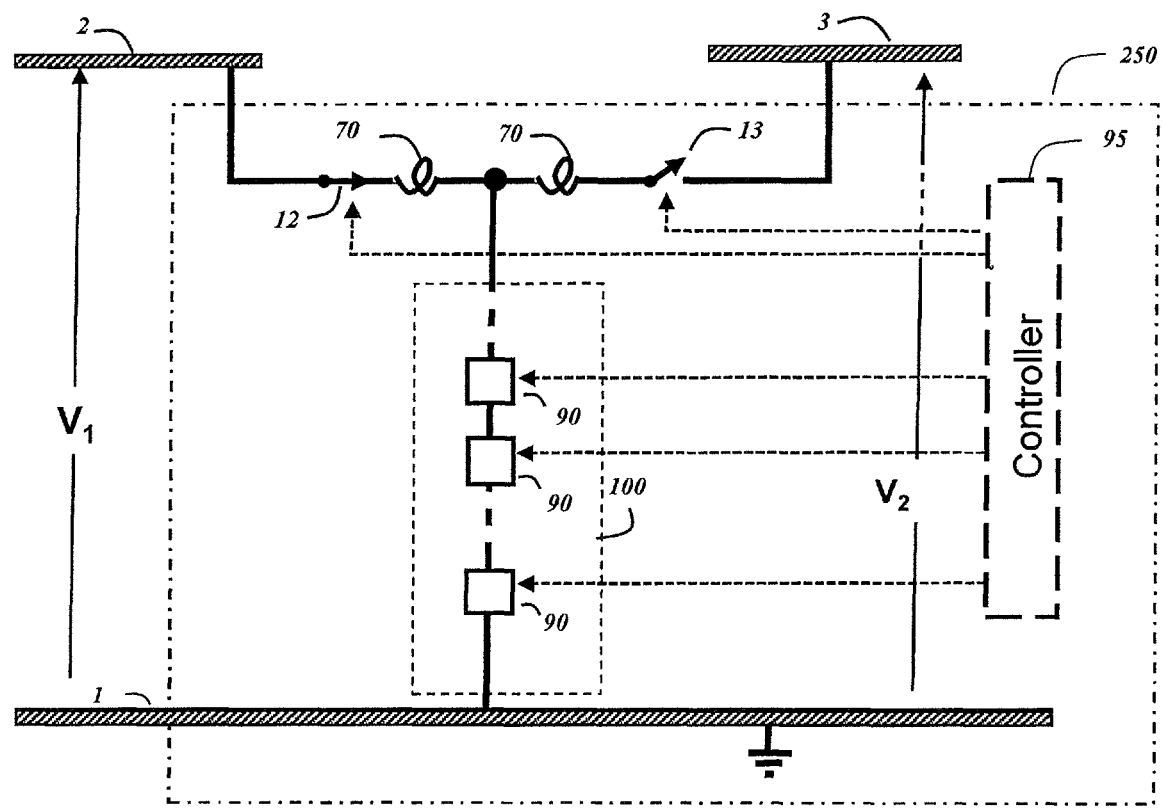
FIG. 2 shows a prior art schematic of a capacitive column DCT, based on prior art, when connected to exchange charge with the first of two DC nodes.
Figure 16:
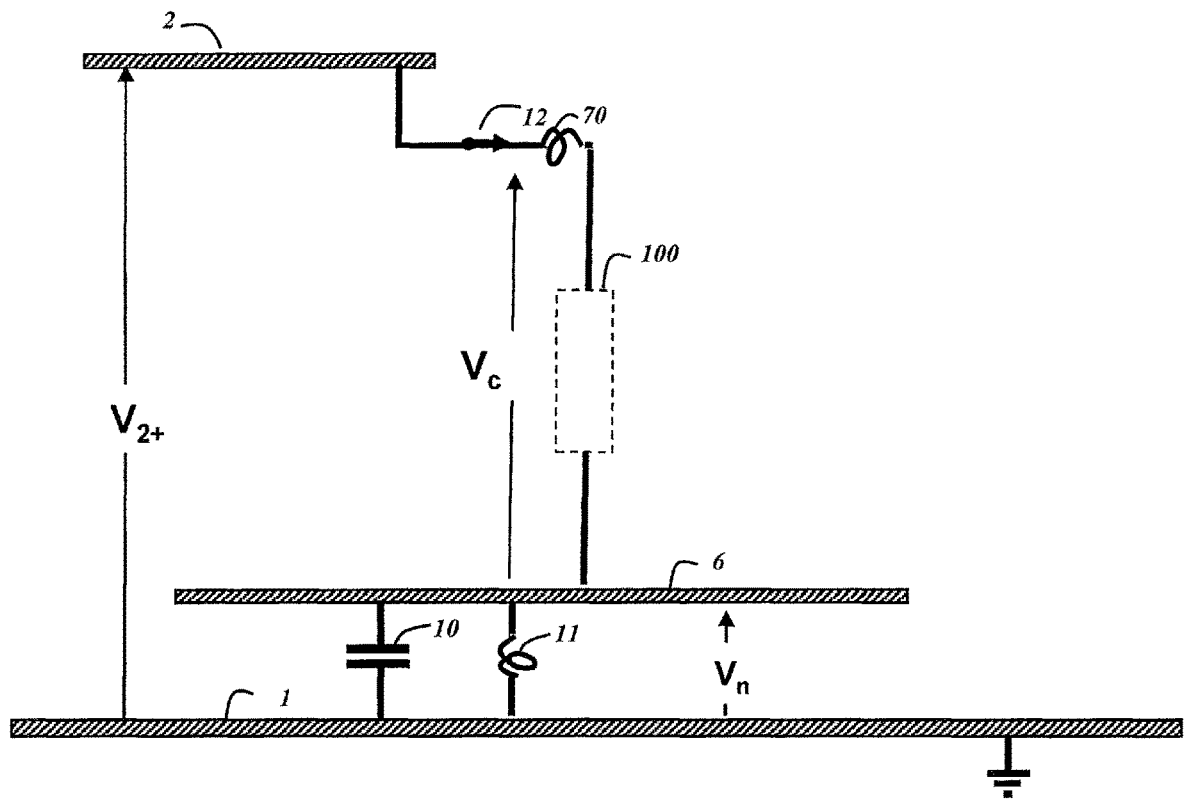
FIG. 16 shows the system and method of FIG. 15 wherein the second DC bus is eliminated, thus constituting a bipolar DC to three-phase AC transformer.

In any multi-module DCT based on the principles shown FIGS. 2 and 3, power transfer between nodes 2 and 3 in that case can be adjusted in magnitude and direction by adjustment of the number of capacitive modules in place while the capacitive column exchanges charge with node 1 and the number in place during charge exchange with node 3. If the column's capacitive module configuration is made to present a voltage of exactly $V_1$ to node 2 and exactly $V_2$ to node 2, no power will be transferred between those two nodes 2, 3 as the transformation cycle is repeated. Thus if, in the embodiment of FIG. 11, no power is to be transmitted between nodes 2 and 3, the switch 13 serves no purpose and can be eliminated along with its associated reactor 70 as shown in FIG. 16.

Figure 15:
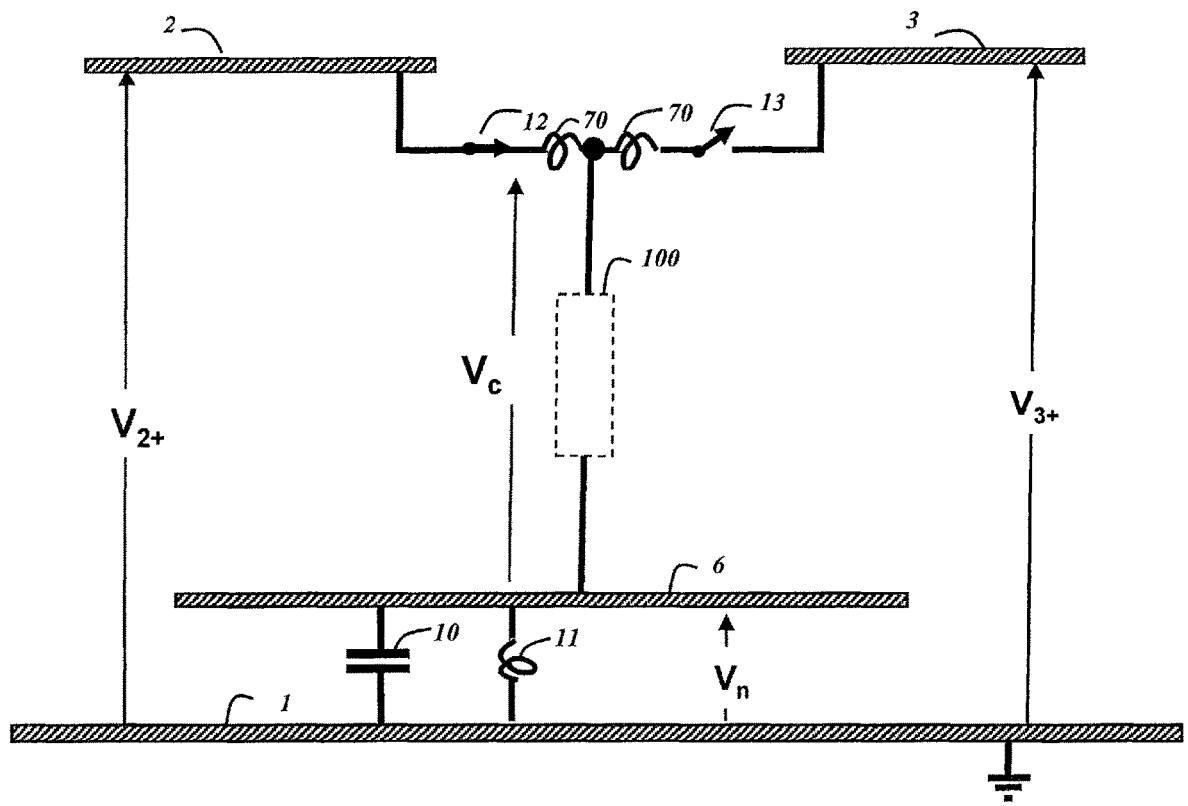
FIG. 15 shows the addition of a grounding reactor to prevent build-up of DC voltage on the offset-neutral node.
Figure 17:
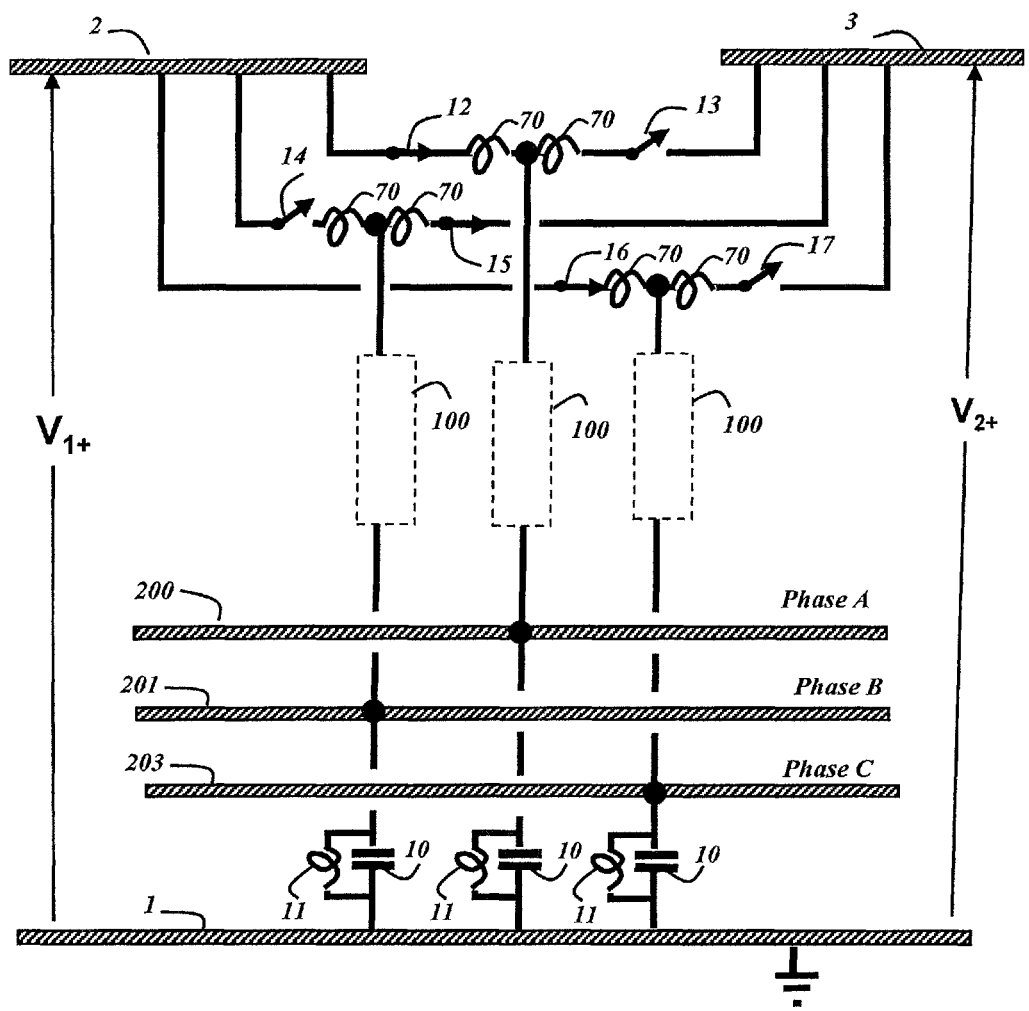
FIG. 17 shows how transformation can be achieved between either or both of two monopolar DC nodes and a set of three-phase AC nodes.
Figure 18:
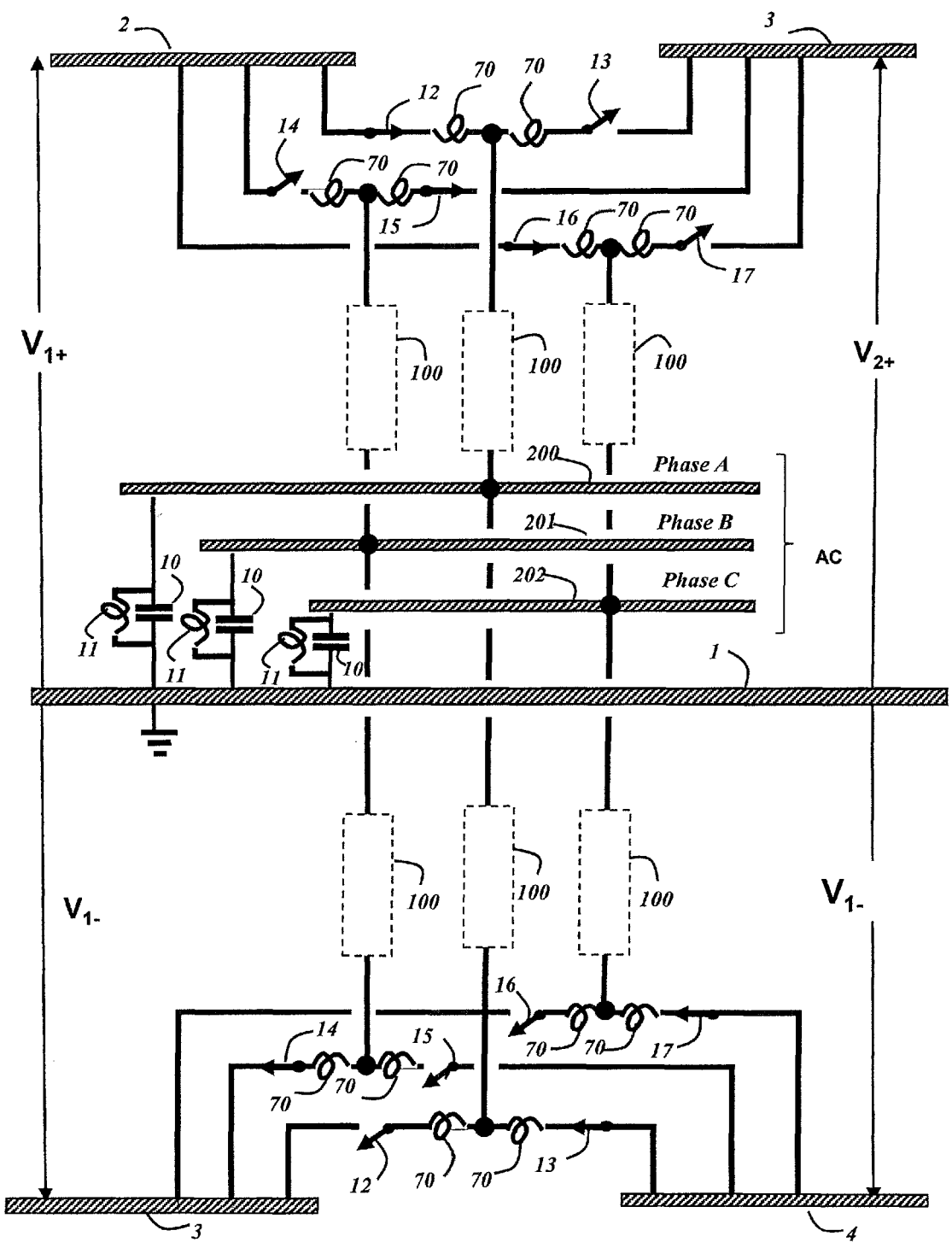
FIG. 18 extends FIG. 17 to show transformation of power between bipolar DC nodes and a set of three-phase AC nodes.

Furthermore it will be apparent from explanation of the embodiment shown in FIG. 15 wherein a single capacitive column 100 served by two DC nodes 2, 3, was shown capable of transforming power between those monopolar DC nodes 2, 3, and a single-phase AC node 6, that this embodiment can be extended by using three capacitive columns as shown in FIG. 17, that three such configurations, connected to the same monopolar nodes 2,3 can transform power between those DC nodes 2, 3 and each of three AC nodes 200, 201, 202. comprising a three phase AC source. It is further apparent from FIG. 18 that adding a mirror image of the DCT embodiment shown in FIG. 17 to that shown in FIG. 17 would, as shown in FIG. 18, allow bipolar DC node pairs 2, 3 and 3, 4 to exchange power with a three phase AC node set 200, 201, 203.

Within all the above cited embodiments, power flow between any two bipolar DC voltage sources will respond either to changes in the relative primary and secondary DC voltages presented to the DCT due to system operation or to a deliberate adjustment of the number of capacitive modules bypassed during connection to the lower of the DC voltages, i.e. manual control.

While explanation of some of the foregoing embodiments have been illustrated by use of a single capacitive column 100, 101 for the sake of simplifying explanation, it will be apparent that each embodiment can be extended to use multiple capacitive columns in parallel, each equally offset in timing from the other, to produce smoother input and output voltage and current wave-forms and, further, that prior art filters can further smooth those waveforms.

Figure 1:
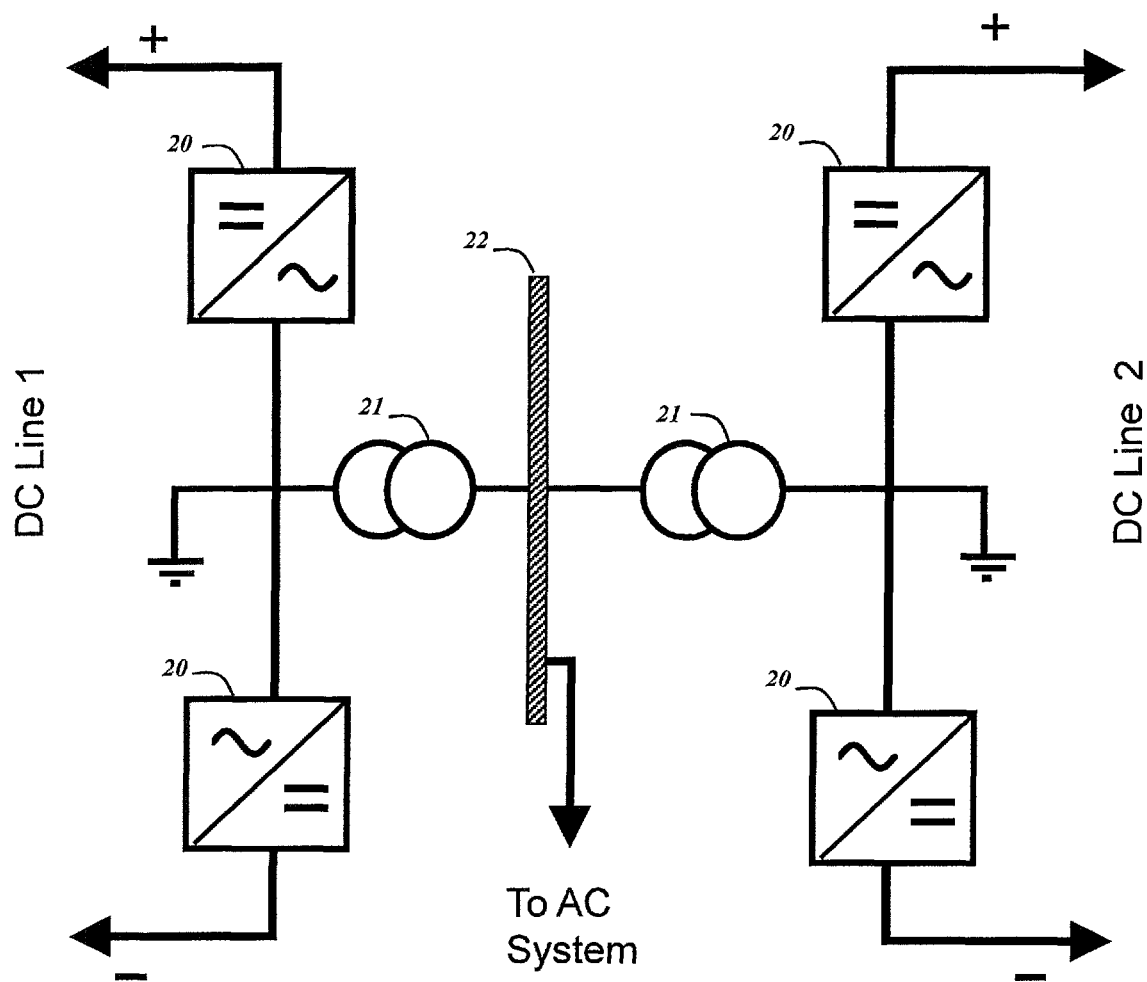
FIG. 1 shows the prior art configuration necessary to connect the juncture of two DC transmission lines to an AC system in a self-redundant manner using prior art equipment.
Figure 19:
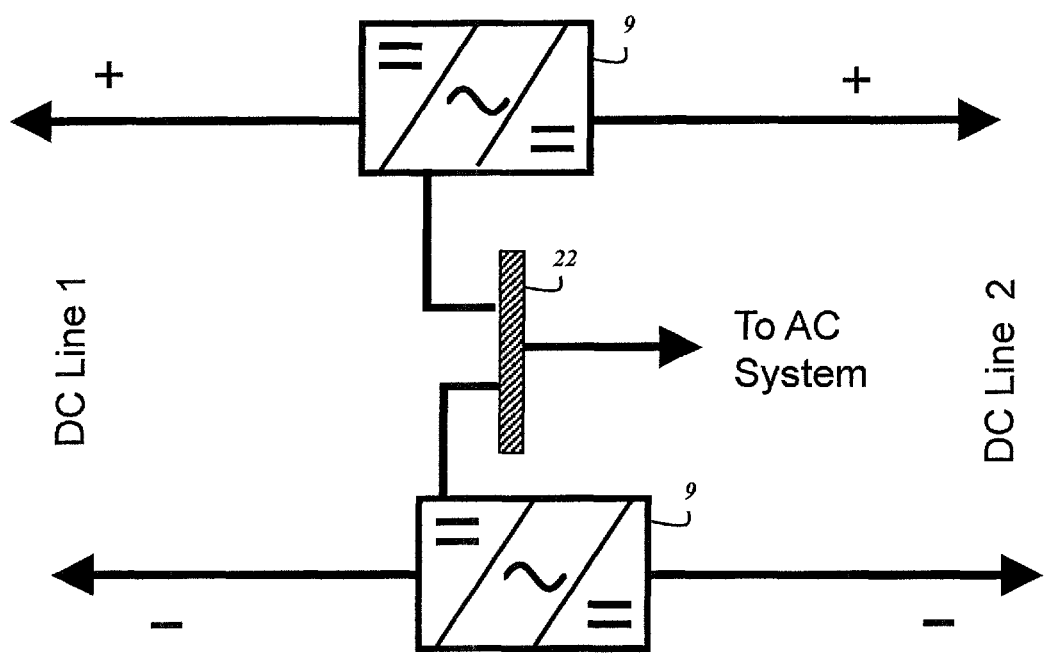
FIG. 19 illustrates use of the embodiments in simplifying the interconnection of incoming DC transmission lines in the underlying AC system.

The general schematic of FIG. 1 illustrated the principle of self-redundancy. FIG. 19 illustrates that the same degree of redundancy can be achieved by incorporating the embodiment cited above into a DC-AC-DC transformer 9, using a simpler array of components than was shown in FIG. 1 while simultaneously allowing power transfer between multiple incoming DC lines without double DC/AC transformation. The embodiments cited herein also allow continuity of DC to AC power transfer despite the loss of one DC pole or, for multiple DC taps of small rating, DC to AC exchange from just one DC polarity.

A number of implementations have been described. Nevertheless, it will be understood that additional modifications may be made without departing from the scope of the inventive concepts described herein, and, accordingly, other embodiments are within the scope of the following claims.

What is claimed is:

1. A power transformation system that is constructed and arranged to transform power from one or more primary voltage nodes to a separate secondary voltage node, the system comprising:
   (a) one or more columns, each column comprising a plurality of capacitive modules, where the capacitive modules comprise a plurality of series-connected capacitances that are arranged to be either electrically inserted into the column or electrically isolated and electrically bypassed;
   (b) a secondary voltage node that is at a non-ground potential, wherein a first end of a column is electrically connected to the secondary voltage node;
   (c) multiple high voltage switches, each in series with a column; each high-voltage switch adapted to electrically connect, sequentially, a second end of the column to a primary voltage node;
   (d) a fourth node that is at a ground potential;
   (e) a capacitor that is electrically connected between the secondary node and the fourth node, wherein the capacitor has a susceptance that is larger than a susceptance of the columns; and
   (f) a controller adapted to control the connections of the capacitances within a column and two high voltage switches that are in series with the column, so as to transform power by resonant exchange of energy between multiple capacitances within the column and both primary and secondary nodes.

2. The power transformation system of claim 1, wherein an aggregate voltage rating of all capacitive modules comprising a column exceeds the voltage of any oldie primary voltage nodes.

3. The power transformation system of claim 1, wherein the primary nodes are high voltage DC nodes.

4. The power transformation system of claim 3, wherein the resonant exchange comprises a repeating cycle of sequential charge exchanges with each of the primary nodes, and wherein the controller is further adapted to control one or both the number and configuration of series-connected capacitive modules comprising the capacitive column, such that a terminal-to-terminal voltage of the capacitive column is changed from one step in the capacitive column charge exchange cycle and the next.

5. The power transformation system of claim 4, wherein the controller is further adapted to configure the potential of the secondary voltage node to be equal to the voltage of any one of the primary voltage nodes minus the terminal-to-terminal voltage of the capacitive column.

6. The power transformation system of claim 5, wherein the controller is further adapted to prevent the potential of the secondary voltage node from drilling from its nominal value.

7. The power transformation system of claim 5, wherein the controller is further adapted to reconfigure the capacitive column from one cycle to the next such that the potential of the secondary voltage node varies in a manner approximating a sinusoid.

8. The power transformation system of claim 7, wherein the capacitive column is configured such that its voltage is greater than the voltage of any of the primary voltage nodes, thereby allowing the voltage on the secondary node to be a full sinusoidal voltage, with positive and negative half-cycles that are equal in voltage magnitude with respect to ground.

9. The power transformation system of claim 8, comprising multiple capacitive columns that are controlled to simultaneously transform power from one or more primary nodes to three secondary nodes each one of which represents one phase of a three phase AC node.

10. The power transformation system of claim 9, wherein the DC primary nodes are bipolar, each pole of which is configured to transform power to a three-phase AC node set.

11. The power transformation system of claim 1, configured to transform power between primary DC nodes and an additional DC secondary node, all of which are bipolar DC nodes.

* * * * *